United States Patent [19]

Wright

[11] 4,169,828

[45] Oct. 2, 1979

[54] BEAD SIZE DISTRIBUTION IN THE SUSPENSION POLYMERIZATION OF VINYL AROMATIC MONOMERS

[75] Inventor: Harold A. Wright, Murrysville, Pa.

[73] Assignee: Arco Polymers, Inc., Philadelphia, Pa.

[21] Appl. No.: 864,188

[22] Filed: Dec. 27, 1977

[51] Int. Cl.$^2$ .................. C08F 12/04; C08F 12/08; C08F 12/18; C08F 279/02

[52] U.S. Cl. .................. 525/264; 524/242; 525/265; 525/292; 525/316; 525/305; 525/304; 525/306; 525/308; 526/204;

[58] Field of Search .............. 526/910, 909, 211, 204, 526/215, 346; 260/880 R

[56] References Cited

U.S. PATENT DOCUMENTS

| | | | |
|---|---|---|---|
| 2,380,591 | 7/1945 | Fryling | 526/215 |
| 3,222,340 | 12/1965 | Harris | 526/215 |
| 3,328,374 | 6/1967 | Ronden et al. | 526/215 |
| 3,470,146 | 9/1969 | Maclay | 526/910 |
| 3,649,610 | 3/1972 | Wright | 526/910 |
| 3,755,282 | 8/1973 | Wright | 526/909 |
| 3,786,115 | 1/1974 | Osuga et al. | 526/909 |
| 3,994,840 | 11/1976 | Kajimura et al. | 526/910 |

FOREIGN PATENT DOCUMENTS 923893  4/1963  United Kingdom .............. 526/215

*Primary Examiner*—Herbert J. Lilling
*Attorney, Agent, or Firm*—Lewis J. Young

[57] ABSTRACT

The production of polymer beads by a suspension polymerization process in which a vinyl aromatic monomer having a free-radical generating catalyst dissolved therein is suspended in an aqueous medium with the aid of from 0.1 to 2.0 percent by weight, based on monomer, of a finely divided phosphate suspending agent in the presence of a modifier and heated to cause the monomer to polymerize into polymer beads is improved by the addition to the suspension of at least about 0.01 percent by weight based on monomer of an adjunct modifier, such as certain aminoalkanecarboxylic acids and N-substituted derivatives thereof. The process of the invention is especially applicable in the preparation of large polymer beads.

7 Claims, No Drawings

BEAD SIZE DISTRIBUTION IN THE SUSPENSION POLYMERIZATION OF VINYL AROMATIC MONOMERS

BACKGROUND OF THE INVENTION

Free-radical initiators, particularly peroxidic initiators such as benzoyl peroxide, are commonly used as the primary initiator, or catalyst, in the suspension polymerization of vinyl aromatic monomers such as styrene. These initiators, being predominantly oil soluble and water insoluble, are believed to react within the monomer droplets in suspension to cause the polymerization in the following manner:

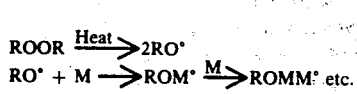

$$ROOR \xrightarrow{Heat} 2RO\cdot$$
$$RO\cdot + M \rightarrow ROM\cdot \xrightarrow{M} ROMM\cdot \text{ etc.}$$

Grim U.S. Pat. No. 2,673,194, describes the suspension polymerization of vinyl aromatic monomers, whereby an oily monomer is suspended as droplets in an aqueous medium and polymer beads or particles are produced by the use of an oil-soluble polymerization catalyst, such as benzoyl peroxide. The suspending system of the Grim patent is comprised of finely divided, difficultly water-soluble, inorganic phosphates, and an anionic surface-active agent which serves as a modifier. As used in this art, compounds which act to increase the ability of the finely divided phosphate dispersant to stabilize suspensions are termed modifiers. The modifiers increase the ability of the phosphate dispersant to maintain stable suspensions with a greater proportion of monomer and/or polymer in the suspension polymerization medium. Among the modifiers listed by Grim are: sodium dodecylbenzene sulfonate, sodium tetradecyl sulfate, potassium stearate, and long chain alkyl sulfonates.

The suspension systems such as that of Grim produce polymer beads having a broad particle size distribution. The individual beads produced in suspension may range in diameter from less than 300 microns to above 2,000 microns with the average bead diameter being dependent upon the amount of suspending agent and modifier present in the system. The average bead diameter can be controlled to some extent by varying the parameters of the system such as the ratio of suspending agent to modifier or the ratio of suspending agent and modifier to monomer. Although the average diameter size is changed through such variations, nevertheless, beads will be produced whose particle size distribution is broad.

For commercial reasons, it is highly desirable in this art to control the average particle size range within relatively narrow limits. This is especially true where the polymer beads are to be impregnated with a volatile expanding agent to produce polymer beads which will, upon heating, expand, e.g. in a mold, to fill the mold cavity and produce fused, expanded polymer articles.

One of the major uses of expandable polymer beads, particularly polystyrene beads, which are produced commercially by suspension polymerization, is in insulation applications such as insulation board. In manufacturing insulation board, it is common to mold a large (e.g. 4'×8'×20') billet of expanded polystyrene and subsequently cut the billet into slabs one or two inches thick for ultimate use as an insulation board. In preparing the large billets from expandable polymer beads, the beads are first pre-expanded to form non-fused, partially expanded beads having a bulk density of from 0.8–1.2 pounds per cubic foot. The partially expanded beads are then charged to the billet mold, and heat, usually in the form of steam, is applied to fully expand the beads whereby they fill the mold, fuse, and form the billet.

In the billet-molding application, it is especially critical that the expandable polymer beads be relatively large and substantially spherical.

If the beads are too small, then the expandable beads at the outer surface of the billet mold will fuse too soon, thereby excluding steam from the center of the mold. The resulting billet, therefore, has a center of unfused, expanded beads which is, of course, highly undesirable since any unfused portion of the billet is useless.

Hohenstein et al, in U.S. Pat. No. 2,652,392, reduced the amount of small particle-size beads formed by adding less than 0.01 percent based on monomer of a water-soluble persulfate as modifier for the calcium phosphate stabilizer.

I have shown in my U.S. Pat. No. 3,631,014, that narrow distribution of bead sizes larger than 300 microns (45 mesh) in diameter can be produced by the addition of at least 0.0003 percent by weight based on monomer of sodium bisulfite as modifier for the phosphate.

I have also shown in my U.S. Pat. No. 3,649,610, that narrow distribution of bead sizes larger than 750 microns (25 mesh) in diameter can be produced by the addition of at least 0.01 percent by weight based on monomer of certain terminal vicinal hydroxy-keto compounds as modifier for the phosphate.

I have also shown in my U.S. Pat. No. 3,755,282, that narrow distribution of bead sizes larger than 1200 microns (16 mesh) in diameter can be produced by the addition of at least 0.0001 percent by weight based on monomer of α, β-unsaturated carboxylic acids as modifier for the phosphate.

SUMMARY OF THE INVENTION

I have now discovered that the control of bead size distribution can be improved for beads having larger than 600 micron diameters by the use of bisulfite or persulfate modifier in the presence of an adjunct modifier comprising a compound of general formula

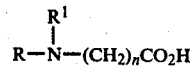

$$R-\underset{\underset{R^1}{|}}{N}-(CH_2)_n CO_2H$$

where n is 1, 2 or 3, and R and $R^1$ may be the same or different and R and $R^1$ may be hydrogen, 2-hydroxyethyl, 2-acetamido, tris (hydroxymethyl) methyl, cyclohexyl, or R and $R^1$ together may form ring structures such as morpholino, and piperazino.

DETAILED DESCRIPTION OF THE INVENTION

This invention is applicable in the suspension polymerization of vinyl aromatic monomers such as styrene, alpha-methyl styrene, mono- and dichloro styrene, as well as the copolymerization of vinyl aromatic monomers with such monomers as divinylbenzene, alkyl and allyl acrylates and methacrylates, diallyl esters of dibasic, aliphatic or aromatic acids, butadiene, and other polymers capable of further polymerization such as styrene-butadiene, styreneisoprene, and polybutadiene rubbers.

The finely divided, difficultly water-soluble phosphates useful as dispersing agents in the practice of this invention are conventional and are those described, for example, in Grim U.S. Pat. No. 2,673,194. They include those finely divided phosphates difficultly soluble in water containing for each phosphate group at least three equivalents of a metal, the carbonate of which is only slightly soluble in water, e.g. tricalcium phosphate, hydroxy-apatite, magnesium phosphate, etc. Advantageously, the amount of phosphate to be employed in this invention ranges from about 0.10 to 2.0% by weight based on monomer. The average particle size of polymer beads produced in the suspension polymerization depends primarily upon the total amount of phosphate suspending agent; for example, suspension with larger amounts of phosphate suspending agent yields beads of a smaller average particle size.

The sodium bisulfite or potassium persulfate modifiers are used in amounts of at least about 0.0003 percent by weight based upon the weight of the monomer. About 0.0003 percent by weight of modifier is required to produce a stable suspension. The use of such minute amounts is possible because the stabilizing effect of the modifier does not appear to be adversely affected by the presence of dirt or other oxidizable impurities in the system. Excessive amounts of modifier may cause unstable suspensions and amounts greater than 0.20 percent by weight do not appreciably increase its effect.

The adjunct modifiers useful in this invention are generally prepared from bromoacetic acid or β-bromopropionic acid and the appropriate amine by reaction in sodium hydroxide solution. The preparation of many of the compounds is described by Good, et al, in Biochemistry, Volume 5, February 1966, pages 467–477. Some are commercially available from laboratory chemical suppliers. The adjunct modifiers may be represented by the formula $$R-\underset{\underset{R^1}{|}}{N}-(CH_2)_nCO_2H$$

where n is 1, 2 or 3 and R and $R^1$ may be the same or different and may be hydrogen, 2-hydroxyethyl, 2-acetamido, tris (hydroxymethyl) methyl, cyclohexyl, or R and $R^1$ together may form ring structures such as morpholino, piperazino, and N'-(2-hydroxyethyl)-piperazino. The amounts of adjunct modifier used may vary between 0.02 and 5.0 percent by weight based on monomer. Use of less than 0.01 weight percent does not produce narrow distribution of bead diameter sizes, while higher amounts than 5.0 do not appear to have any beneficial effect on the size which would warrant the increased usage.

Examples of such adjunct modifiers and the code designations to be used herein to save space are as follows

| Code Name | Chemical Name |
|---|---|
| Glycine | Aminoacetic acid |
| β-Alanine | β-Aminopropionic acid |
| Bicine | N, N-Bis(2-hydroxyethyl) glycine |
| Tricine | N-Tris(hydroxymethyl) methyl glycine |

The process of the invention may be used with monomer to water ratios which vary from about 0.3 to 1.5 parts by weight monomer per 1.0 part by weight water. The invention is especially valuable in that generally high monomer to water ratios are used, and a higher proportion of monomer in the suspension system is, of course, preferred from an economic standpoint.

The time and temperature cycles for the polymerization may be those conventionally employed. Conveniently, the cycle described in the Grim patent above, or the two-stage temperature cycle described in D'Alelio U.S. Pat. No. 2,692,260 is employed.

The free-radical initiating catalysts which are added to the suspension system are the conventional oil-soluble (monomer-soluble) oxidation catalysts such as organic peroxides, e.g. benzoyl peroxide and t-butyl perbenzoate. Other free-radical producing catalysts that may be used in the invention include azobisisobutyronitrile. Conveniently, conventional amounts of such catalysts are used in the invention.

This invention is further illustrated by, but is not intended to be limited to, the following examples wherein parts are parts by weight unless otherwise indicated.

EXAMPLE I

To a 12 oz., crown-capped bottle was added 100 parts of water, 0.25 part of the dispersing agent, tricalcium phosphate, 0.0025 part of sodium bisulfite as modifier for the phosphate, the amount and kind of adjunct modifier shown in Table I, and 100 parts of styrene containing 0.30 part of the catalyst comprising 0.25 part of benzoyl peroxide and 0.05 part of t-butyl perbenzoate. The amount of adjunct modifier is expressed as weight percent based on monomer. The bottle was capped and tumbled end-over-end in a heated oil bath at 90° C. for 6 hours. The bottle were cooled to room temperature, opened and acidified with hydrochloric acid to a pH of about 1.0 to dissolve the phosphate. The beads were separated by centrifuge, washed with water and air dried. The dried beads were subjected to screen analysis using U.S. Standard Sieves to determine median bead size and standard deviation from the median size. The distribution index, DI, was calculated as follows:

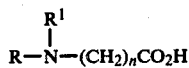

$$DI = \frac{\text{standard deviation } (\mu)}{\text{median bead size } (\mu)} \times 100.$$

The lower the DI, the more narrow the bead size distribution and the less unwanted fines and larger beads were produced. The results are shown in Table I.

Table I

| Run No. | Adjunct Modifier | Amount Wt. % | Median Bead Size, Mesh | DI, % |
|---|---|---|---|---|
| 1 | None | — | 16 | 61.3 |
| 2 | Glycine | 0.1 | 14 | 19.0 |
| 3 | Glycine | 0.5 | 14 | 14.0 |
| 4 | Bicine | 0.1 | 18.0 | 60.8 |
| 5 | Bicine | 0.5 | 21.0 | 17.8 |
| 6 | Tricine | 0.1 | 25 | 14.0 |
| 7 | Tricine | 0.5 | 25 | 15.7 |

From the data it can be seen that by selecting the proper adjunct modifier one can obtain, under the conditions of this example, narrow bead size distributions for any size bead between 590 microns (~30 mesh) and 1200 microns (~16 mesh) diameter. It is not understood why the lower concentration of Bicine did not give a significant improvement in DI in run 4 unless this single run involved experimental error.

EXAMPLE II

To illustrate the range of adjunct modifiers useful in this invention, the procedure of Example I was repeated using the amounts of adjunct modifier shown in Table II. Also shown are the screen analysis results.

Table II

| Run No. | Adjunct Modifier | Amount Wt. % | Median Bead Size, Mesh | DI, % |
|---|---|---|---|---|
| 1 | None | — | 16 | 61.3 |
| 2 | Glycine | 0.035 | 17 | 25.7 |
| 3 | Glycine | 0.1 | 14 | 19.0 |
| 4 | Glycine | 0.5 | 14 | 14.0 |
| 5 | Glycine | 0.5* | 16 | 27.0 |
| 6 | β-Alanine | 0.042 | 16 | 31.7 |
| 7 | Tricine | 0.010 | 14 | 36.0 |
| 8 | Tricine | 0.050 | 14 | 48.0 |
| 9 | Tricine | 0.10 | 25 | 14.0 |
| 10 | Tricine | 0.50 | 25 | 16.0 |
| 11 | Tricine | 0.50* | 14 | 22.0 |
| 12 | Tricine | 1.0 | 19 | 18.0 |
| 13 | Tricine | 2.0 | 18 | 19.0 |
| 14 | Tricine | 3.0 | 17 | 15.0 |
| 15 | Tricine | 5.0 | 17 | 23.0 |

*NaHSO₃ modifier not used.

I claim:

1. In a process for producing polymer beads by suspending a vinyl aromatic monomer selected from the group consisting of styrene, alphamethylstyrene, monochlorostyrene and dichlorostyrene containing a monomer-soluble, free-radical producing catalyst in an aqueous medium with the aid of from 0.1 to 2.0 percent by weight based on monomer of a finely divided, difficultly water-soluble phosphate suspending agent and a bisulfite or persulfate modifier and subjecting the suspension to an elevated temperature to cause said monomer to polymerize, the improvement for producing a narrow distribution of bead diameter sizes which comprises adding to said suspension at least 0.01 percent by weight based on monomer of an adjunct modifier selected from the group consisting of glycine, β-alanine, N,N-bis-(2-hydroxyethyl) glycine, and N-tris-(hydroxymethyl) methyl glycine.

2. The process of claim 1 wherein said polymerization produces polymer beads having an average particle size greater than 600 microns.

3. The process of claim 1 wherein said monomer is styrene and said catalyst comprises benzoyl peroxide and t-butyl perbenzoate.

4. The process of claim 1 wherein said phosphate is tricalcium phosphate.

5. In a process for producing polymer beads by suspending a vinyl aromatic monomer selected from the group consisting of styrene, alphamethylstyrene, monochlorostyrene, and dichlorostyrene containing a monomer-soluble, free-radical producing catalyst in an aqueous medium with the aid of from 0.1 to 2.0 percent by weight based on monomer of a finely divided, difficultly water-soluble phosphate suspending agent and subjecting the suspension to an elevated temperature to cause said monomer to polymerize, the improvement for producing a narrow distribution of bead diameter sizes which comprises adding to said suspension at least 0.01 percent by weight based on monomer of a sole modifier selected from the group consisting of glycine, β-alanine, N,N-bis-(2-hydroxyethyl) glycine, and N-tris-(hydroxymethyl) methyl glycine.

6. The process of claim 1 wherein said vinyl aromatic monomer is copolymerized with a monomer selected from the group consisting of divinylbenzene, an alkyl acrylate, allyl acrylate, an alkyl methacrylate, allyl methacrylate, a diallyl ester of a dibasic aliphatic acid, a diallyl ester of a dibasic aromatic acid, butadiene, and polymers capable of further polymerization selected from the group consisting of styrene-butadiene rubbers, styrene-isoprene rubbers, and polybutadiene rubbers.

7. The process of claim 5 wherein said vinyl aromatic monomer is copolymerized with a monomter selected from the group consisting of divinylbenzene, an alkyl acrylate, allyl acrylate, an alkyl methacrylate, allyl methacrylate, a diallyl ester of a dibasic aliphatic acid, a diallyl ester of a dibasic aromatic acid, butadiene, and polymers capable of further polymerization selected from the group consisting of styrene-butadiene rubbers, styrene-isoprene rubbers and polybutadiene rubbers.

* * * * *